United States Patent
Mourad et al.

(10) Patent No.: US 12,166,849 B2
(45) Date of Patent: *Dec. 10, 2024

(54) DATA STRUCTURE FOR PHYSICAL LAYER ENCAPSULATION

(71) Applicant: SAMSUNG ELECTRONICS CO., LTD., Suwon-si (KR)

(72) Inventors: Alain Mourad, Staines-upon-Thames (GB); Sung-hee Hwang, Suwon-si (KR); Daniel Ansorregui, Staines-upon-Thames (GB); Belkacem Mouhouche, Staines-upon-Thames (GB); Hak-ju Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/313,918

(22) Filed: May 8, 2023

(65) Prior Publication Data
US 2023/0275982 A1    Aug. 31, 2023

Related U.S. Application Data

(63) Continuation of application No. 17/060,599, filed on Oct. 1, 2020, now Pat. No. 11,677,867, which is a (Continued)

(30) Foreign Application Priority Data

Jun. 27, 2013  (GB) ........................... 1311443
Aug. 13, 2013  (KR) ................. 10-2013-0096128

(51) Int. Cl.
*H04N 19/70* (2014.01)
*G06F 16/21* (2019.01)
(Continued)

(52) U.S. Cl.
CPC .......... *H04L 69/324* (2013.01); *G06F 16/211* (2019.01); *H04B 1/02* (2013.01);
(Continued)

(58) Field of Classification Search
CPC ..... H04L 69/324; H04L 69/22; H04L 69/323; G06F 16/211; H04B 1/02; H04H 60/73; H04N 19/70; H04N 21/234; H04N 21/236
See application file for complete search history.

(56) References Cited

U.S. PATENT DOCUMENTS 4,342,983 A    8/1982   Weigand et al.
5,033,027 A    7/1991   Amin
(Continued)

FOREIGN PATENT DOCUMENTS

CN    101180674 A    5/2008
CN    101636979 A    1/2010
(Continued)

OTHER PUBLICATIONS

Search Report dated Oct. 2, 2014 issued by the International Searching Authority in PCT/KR2014/00558 (PCT/ISA/210).
(Continued)

*Primary Examiner* — William Spieler
(74) *Attorney, Agent, or Firm* — Sughrue Mion, PLLC

(57) ABSTRACT

Provided are a data structure including a header area, and a payload area comprising data, a method of generating the data structure, and extracting information from the data structure. At least one of the header area and the payload area includes at least one sub-area in which one or more signal fields are included. At least one signal field among the signal fields includes information for signalling presence or absence of one or more information fields located at least (Continued)

partly in the data structure, the one or more information fields corresponding to the one or more signal fields.

5 Claims, 10 Drawing Sheets

Related U.S. Application Data continuation of application No. 15/458,531, filed on Mar. 14, 2017, now Pat. No. 10,827,045, which is a continuation of application No. 14/243,103, filed on Apr. 2, 2014, now Pat. No. 9,633,053.

(51) Int. Cl.
| | | |
|---|---|---|
| H04B 1/02 | (2006.01) | |
| H04H 20/95 | (2008.01) | |
| H04H 60/73 | (2008.01) | |
| H04L 69/22 | (2022.01) | |
| H04L 69/323 | (2022.01) | |
| H04L 69/324 | (2022.01) | |
| H04N 21/234 | (2011.01) | |
| H04N 21/236 | (2011.01) | |

(52) U.S. Cl.
CPC ............ *H04H 20/95* (2013.01); *H04H 60/73* (2013.01); *H04L 69/22* (2013.01); *H04L 69/323* (2013.01); *H04N 19/70* (2014.11); *H04N 21/234* (2013.01); *H04N 21/236* (2013.01)

(56) References Cited

U.S. PATENT DOCUMENTS

| | | | |
|---|---|---|---|
| 5,172,341 | A | 12/1992 | Amin |
| 6,112,017 | A | 8/2000 | Wise |
| 7,050,407 | B1 | 5/2006 | Frazer et al. |
| 2005/0237992 | A1 | 10/2005 | Mishra et al. |
| 2007/0177595 | A1 | 8/2007 | Yeh et al. |
| 2008/0075081 | A1 | 3/2008 | Mangal et al. |
| 2009/0098892 | A1 | 4/2009 | Trogolo et al. |
| 2010/0098415 | A1 | 4/2010 | Jiang |
| 2010/0195638 | A1 | 8/2010 | Song et al. |
| 2010/0195712 | A1 | 8/2010 | Yu et al. |
| 2011/0007753 | A1 | 1/2011 | Agiwal et al. |
| 2014/0101369 | A1 | 4/2014 | Tomlin et al. |

FOREIGN PATENT DOCUMENTS

| | | |
|---|---|---|
| CN | 102301703 A | 12/2011 |
| CN | 102474512 A | 5/2012 |
| EP | 2187557 A2 | 5/2010 |
| EP | 2 209 246 A1 | 7/2010 |
| KR | 10-2011-0104555 A | 9/2011 |
| WO | 98/47288 A1 | 10/1998 |
| WO | 01/91497 A1 | 11/2001 |
| WO | 2006/126856 A2 | 11/2006 |
| WO | 2008/114904 A1 | 9/2008 |
| WO | 2010058891 A1 | 5/2010 |
| WO | 2010087546 A1 | 8/2010 |
| WO | 2010087555 A1 | 8/2010 |
| WO | 2010090373 A1 | 8/2010 |
| WO | 2011/008000 A2 | 1/2011 |
| WO | 2011091850 A1 | 8/2011 |
| WO | 2013/028777 A2 | 2/2013 |
| WO | 2013/131469 A1 | 9/2013 |

OTHER PUBLICATIONS

Communication dated Jul. 24, 2019 issued by the State Intellectual Property Office of P.R. China in counterpart Chinese Application No. 201811338757.6.
Communication dated Jan. 29, 2018, from the State Intellectual Property Office of People's Republic of China in counterpart Application No. 201480037117.5.
Communication dated Jan. 14, 2014, issued by the United Kingdom Patent Office in counterpart United Kingdom Application No. GB1311443.4.
European Telecommunications Standards Institute, Digital Video Broadcasting (DVB); Frame structure channel coding and modulation for a second generation digital terrestrial television broadcasting system (DVB-T2), ETSI TN 302 755 V1.3.1 (Apr. 2012) (Year: 2012).
Reexamination Decision issued Feb. 28, 2022 by the Chinese Patent Office for counterpart Chinese Patent Application No. 201811338757.6.
Communication dated Jul. 25, 2016 issued by the Intellectual Property Office of Great Britain in application No. GB1311443.4.
Communication dated Dec. 24, 2013, issued by the United Kingdom Patent Office in counterpart United Kingdom Application No. 1311443.4.
Office Action issued Jun. 17, 2020 by the Brazilian Patent Office in counterpart Brazilian Patent Application No. BR1120150320678.
Communication dated Mar. 30, 2020 issued by the State Intellectual Property Office of P.R. China in counterpart Chinese Application No. 201811338633.8.
Communication dated Nov. 24, 2016, issued by the European Patent Office in counterpart European Application No. 14818032.6.
Communication dated Jun. 17, 2019, issued by the European Patent Office in counterpart European Application No. 14818032.6.
Decision of Rejection issued Jul. 30, 2020 by the State Intellectual Property Office of P.R. China in counterpart Chinese Patent Application No. 201811338633.8.
Written Opinion dated Oct. 2, 2014 issued by the International Searching Authority in PCT/KR2014/00558 (PCT/ISA/237).
Communication dated Jul. 18, 2019 issued by the State Intellectual Property Office of P.R. China in counterpart Chinese Application No. 201811338633.8.
Communication issued Apr. 30, 2021 by the State Intellectual Property Office of P.R. China in counterpart Chinese Patent Application No. 201811338633.8.
Communication dated Jun. 13, 2017 issued by the Intellectual Property Office of Great Britain in application No. GB1311443.4.
Communication dated Jan. 17, 2020 issued by the State Intellectual Property Office of P.R. China in counterpart Chinese Application No. 201811338757.6.
Correia, S et al; "DVB-T2 modulator design supporting multiple PLP and auxiliary streams"; IEEE International Symposium on Broadband Multimedia Systems and Broadcasting; Mar. 24-26, 2010; pp. 1-6; 8 pages total.
Communication dated Jul. 8, 2019, issued by the Korean Intellectual Property Office in counterpart Korean Application No. 10-2013-0096128.
Office Action issued Aug. 5, 2020 by the State Intellectual Property Office of P.R. China in counterpart Chinese Patent Application No. 201811338757.6.
Communication dated Feb. 10, 2021 issued by the State Intellectual Property Office of P.R. China in counterpart Chinese Application No. 201811338757.6.
Communication dated Oct. 13, 2017 issued by the Intellectual Property Office of Great Britain in application No. GB1311443.4.

DATA STRUCTURE FOR PHYSICAL LAYER ENCAPSULATION

CROSS-REFERENCE TO RELATED APPLICATIONS

This application is a Continuation application of U.S. application Ser. No. 17/060,599 filed Oct. 1, 2020, which is a Continuation application of U.S. application Ser. No. 15/458,531, filed Mar. 14, 2017 (now U.S. Pat. No. 10,827,045, which is a Continuation application of U.S. application Ser. No. 14/243,103, filed Apr. 2, 2014 (now U.S. Pat. No. 9,633,053), which claims priority from Korean Patent Application No. 10-2013-0096128, filed on Aug. 13, 2013, in the Korean Intellectual Property Office and U.K. Patent Application GB1311443.4 filed on Jun. 27, 2013, the disclosures of which are incorporated herein by reference in their entirety.

BACKGROUND

1. Field

Methods and apparatuses consistent with exemplary embodiments relate to a data structure at the physical layer, and more particularly, to a data structure for future generation digital broadcasting systems, for example systems developed by the Digital Video Broadcasting (DVB) Project and/or the Advanced Television Systems Committee (ATSC) (e.g. the ATSC 3.0 Standard).

2. Description of the Related Art

Digital broadcasting techniques allow various types of digital content, for example video and audio data, to be distributed to end users. A number of standards have been developed for this purpose, including a family of standards developed by the ATSC organization, including ATSC 1.0 and ATSC 2.0 standards. The ATSC Digital Television (DTV) Standard, described in various documents, including A/52 and A/53, available at http://www.atsc.org, have been adopted for use in terrestrial broadcasting by various countries, including the United States, Canada and South Korea.

Recently, ATSC has begun developing a new standard, known as ATSC 3.0, for a delivery method of real-time and non-real-time television content and data to fixed and mobile devices. As part of this development, ATSC has published a Call for Proposals (CFP) document (TG3-S2 Doc. #023r20, "Call for Proposals For ATSC-3.0 PHYSICAL LAYER, A Terrestrial Broadcast Standard", ATSC Technology Group 3 (ATSC 3.0), 26 Mar. 2013), in which a stated goal is to identify technologies that could be combined to create a new physical layer of an ATSC 3.0 Standard. It is envisaged that the ATSC 3.0 system will be designed with a layered architecture and a generalized layering model for ATSC 3.0 has been proposed. The scope of the aforementioned CFP is limited to the base layer of this model, the ATSC 3.0 Physical Layer, which corresponds to Layer 1 and 2 of the ISO/IEC 7498-1 model.

It is intended that ATSC 3.0 will not require backward compatibility with current broadcasting systems, including ATSC 1.0 and ATSC 2.0. However, the CFP states that, wherever practicable, the standard shall utilize and reference existing standards that are found to be effective solutions to meet the requirements.

Other existing standards developed for broadcasting digital content include a family of open standards developed and maintained by the Digital Video Broadcasting (DVB) Project and published by the European Telecommunications Standards Institute (ETSI). One such standard is DVB-T2, which is described in various documents, including ETSI EN 302 755 V1.3.1, ("Digital Video Broadcasting (DVB); Frame structure channel coding and modulation for a second generation digital terrestrial television broadcasting system (DVB-T2)"), and Technical Specification ETSI TS 102 831 V1.2.1 ("Digital Video Broadcasting (DVB); Implementation guidelines for a second generation digital terrestrial television broadcasting system (DVB-T2)").

In DVB-T2, data is transmitted in a frame structure. Service data (for example in the form of one or more MPEG-2 Transport Streams, or Generic Encapsulated Streams (GSE)) may be separated into one or more data streams, which are then carried in the form of Physical Layer Pipes (PLPs). Each PLP is a logical channel, which may carry one or multiple services at a given Quality of Service (QoS). Each PLP is associated with a certain modulation and Forward Error Correction (FEC) protection mode which is statically configurable, and other Physical Layer (L1) configurations, for example time interleaving depth. A PLP is a container of baseband frames (BBFRAMEs) with a corresponding structure, and a BBFRAME cannot be owned by more than one PLP. A BBFRAME is an L1 container for encapsulating User Packets (UPs) received from the Data Link Layer (L2), and has a particular data structure that is processed independently by the FEC encoder. A BBFRAME may be regarded as a codeword structure.

FIG. 1 illustrates the structure of a DVB-T2 BBFRAME. The BBFRAME 100 comprises a header 101 of fixed length (10 bytes), a data field 103 of variable length (DFL), and a field 105 of variable length (PADL) for padding and/or in-band signalling. The total length of the BBFRAME 100 is fixed at $K_{bch}$ bits.

The BBFRAME 100 is encoded by performing BCH outer coding and LDPC inner coding, and the parity check bits of the BCH outer code and the parity check bits of the inner LDPC code are appended to the end of the BBFRAME 100. The maximum size of the data field 103 DFL depends on the chosen LDPC code, the chosen BCH code, and whether or not the BBFRAME 100 includes in-band signalling.

The bits of UPs may be allocated to the data field of BBFRAMEs using fragmentation or no fragmentation. When using no fragmentation, an integer number of UPs are allocated to the data field 103 of each BBFRAME 100. When using fragmentation, a number of bits equal to the available data field capacity are allocated, thus potentially breaking up a UP across data fields 103 of subsequent BBFRAMEs 100.

The BBFRAME header 101 is inserted in front of the data field 103 and describes the format of the data field 105. The header 101 comprises a number of fields including a MATYPE field, an optional ISSY field, and a SYNCD field. The MATYPE field signals, among other things, the input stream format (e.g. TS or GSE). The SYNCD field indicates the distance in bits from the beginning of the data field 103 to the beginning of the first transmitted UP which starts in the data field 103. Data processing in the DVB-T2 modulator may produce variable transmission delay on the user information, and thus, the ISSY field carries information including the value of a counter clocked at the modulator clock rate, which can be used by a receiver to regenerate the correct timing of the regenerated output stream. The ISSY field carries other information, for example, related to the buffer size required at the receiver to decode the given PLP.

Padding 105 may be applied in circumstances when user data available for transmission is not sufficient to completely fill a BBFRAME 100, or when an integer number of UPs has to be allocated in a BBFRAME 100 (i.e. when no fragmentation is used). The padding field 105 may also be used to carry in-band signalling. The padding field 105 is appended after the data field 103 and has a size such that the BBFRAME 100 has a constant length of $K_{bch}$ bits.

Another standard for digital broadcasting developed and maintained by the DVB Project is DVB-NGH, which is described in various documents including ETSI EN 303 105 V1.1.1 ("Digital Video Broadcasting (DVB); Next Generation broadcasting system to Handheld physical layer specification (DVB-NGH)") and DVB Bluebook A160. DVB-NGH is designed for broadcasting digital content to handheld terminals, for example mobile telephones.

DVB-NGH keeps the same BBFRAME structure as DVB-T2 and also includes the options of fragmentation and no fragmentation. However, DVB-NGH provides different modes of operation, each mode using a certain header length and data field structure.

What is desired is a data structure, for example a baseband frame structure for use in future generation digital broadcasting systems, for example systems developed by the Digital Video Broadcasting (DVB) Project and/or the Advanced Television Systems Committee (ATSC) (e.g. the ATSC 3.0 Standard).

It is preferable, but not necessary, that the data structure has a good overhead efficiency, for example, such that the sizes of the header and padding field are relatively small compared to the size of the data field. It is also preferable, but not necessary, that the data structure is relatively simple to reduce the implementation complexity. It is also preferable, but not necessary, that the data structure has the capacity to be extended with relatively minor modifications, to enable the frame structure to incorporate new features and co-exist with both legacy and future standards.

SUMMARY

One or more exemplary embodiments of the inventive concept address, solve and/or mitigate, at least partly, at least one of the problems and/or disadvantages associated with the related art, for example at least one of the problems and/or disadvantages described above. One or more exemplary embodiments of the inventive concept also provide at least one advantage over the related art, for example at least one of the advantages described below.

The inventive concept is defined in the independent claims. Advantageous features are defined in the dependent claims.

In accordance with an aspect of an exemplary embodiment, there is provided a data structure which may include: a header area; and a payload area including data, wherein at least one of the header area and the payload area includes at least one sub-area in which one or more signal fields are included, and wherein at least one signal filed among the signal fields includes information for signalling presence or absence of one or more information fields at least partly in the data structure, the one or more information fields corresponding to the one or more signal fields, respectively.

In accordance with an aspect of another exemplary embodiment, there is provided a method for generating a data structure. The method may include: generating a header area, and a payload area for containing data therein; generating one or more signal fields in at least one sub-area in at least one of the header area and the payload area so that at least one signal field among the signal fields includes information for signalling presence or absence of one or more information fields at least partly in the data structure, the one or more information fields corresponding to the one or more signal fields, respectively. The method may further include inserting, in a signal field, a value for signalling presence or absence of the information fields, wherein the information fields are generated if the value inserted in the signal field comprises information for signalling presence of the information fields.

In accordance with an aspect of still another exemplary embodiment, there is provided an apparatus for generating a data structure. The apparatus may include frame builder configured to generate a header area, and a payload area for containing data therein, wherein the frame builder is further configured to generate one or more signal fields in at least one sub-area in at least one of the header area and the payload area so that at least one signal field among the signal fields includes information for signalling presence or absence of one or more information fields at least partly in the data structure, the one or more information fields corresponding to the one or more signal fields, respectively. The frame builder may be further configured to insert, in a signal field, a value for signalling presence or absence of the information fields, and generate the information fields if the value inserted in the signal field comprises information for signalling presence of the information fields.

In accordance with an aspect of still another exemplary embodiment, there is provided a method for extracting information from a data structure, wherein the data structure includes a header area, and a payload area including data, wherein at least one of the header area and the payload area includes at least one sub-area in which one or more signal fields, and wherein at least one signal field among the signal fields includes information for signalling presence or absence of one or more information fields located at least partly in the data structure, the one or more information fields corresponding to the one or more signal fields, respectively. The method may include: extracting, from a signal field, a value for signalling presence or absence of the information fields; and if the value extracted from the signal field comprises information for signalling presence of the information fields, extracting, from the data structure, the information fields at least partly from the data structure.

In accordance with an aspect of still another exemplary embodiment, there is provided an apparatus for extracting information from a data structure, wherein the data structure includes a header area, and a payload area including data, wherein at least one of the header area and the payload area includes at least one sub-area in which one or more signal fields, and wherein at least one signal field among the signal fields includes information for signalling presence or absence of one or more information fields located at least partly in the data structure, the one or more information fields corresponding to the one or more signal fields, respectively. The apparatus may include an information extractor configured to extract, from a signal field, a value for signalling presence or absence of the information fields, and, if the value extracted from the signal field comprises information for signalling presence of the information fields, extract, from the data structure, the information fields at least partly from the data structure.

In accordance with another aspect of the present invention, there is provided a machine-readable storage medium storing a data structure, the data structure including a header area, and a payload area comprising data, wherein the header area comprises a first sub-area comprising one or more signal fields, wherein at least one of the header area and the payload area comprises at least one sub-area in which one or more signal fields are included, and wherein at least one signal filed among the signal fields comprises information for signalling presence or absence of one or more information fields at least partly in the data structure, the one or more information fields corresponding to the one or more signal fields, respectively.

In accordance with an aspect of still another exemplary embodiment, there is provided an apparatus for generating a data structure according to any aspect or claim disclosed herein. In accordance with an aspect of still another exemplary embodiment, there is provided an apparatus for extracting information from a data structure according to any aspect or claim disclosed herein.

In accordance with an aspect of still another exemplary embodiment, there is provided a system comprising two or more apparatuses according to any aspects or claims disclosed herein.

In accordance with an aspect of still another exemplary embodiment, there is provided a machine-readable storage medium storing a data structure in accordance with any aspect or claim disclosed herein.

In accordance with an aspect of still another exemplary embodiment, there is provided a computer program comprising instructions arranged, when executed, to implement a method, system and/or apparatus in accordance with any aspect or claim disclosed herein. A further aspect provides machine-readable storage storing such a program.

According to any of the above-described aspects, at least one information field among the information fields may be included at least partly in a first sub-area, among the at least one sub-area, where a corresponding signal field is included.

According to any of the above-described aspects, the first sub-area may further include padding which is provided to fill the data structure so that the data structure has a given length.

According to any of the above-described aspects, a length of the first sub-area may be variable depending on presence or absence of the at least one of the information fields at least partly in the first sub-area.

According to any of the above-described aspects, the first sub-area may include padding which is provided to fill the data structure so that the data structure has a given length.

According to any of the above-described aspects, the at least one sub-area may further include padding which is provided to fill the data structure so that the data structure has a given length.

According to any of the above-described aspects, the at least one sub-area may have a variable length depending on a length of the at least one of the padding and the signal fields included in the sub-area.

According to any of the above-described aspects, at least one of the information fields may be located at an end of the data structure.

According to any of the above-described aspects, the signal fields may be arranged in the sub-area in a predetermined order.

According to any of the above-described aspects, the information fields may be arranged in the data structure in a predetermined order.

According to any of the above-described aspects, at least one information field among the information fields may include first information about a characteristic of the data or the data structure, and second information about the characteristic of the data or the data structure may be included in a signal field among the signal fields or an outside of the data structure.

According to any of the above-described aspects, the information field may be a synchronization signal field and the first and second information may constitute synchronization information about the data or the data structure.

According to any of the above-described aspects, the data structure may be a baseband frame and the second information may be included in an L1 signalling field.

According to any of the above-described aspects, the signal fields may include a padding signal field, wherein the information fields include a padding length information field for carrying information about a length of padding, depending on information included in the padding signal field, and wherein the padding is provided to fill the data structure so that the data structure has a given length. The padding signal field may include information related to at least one of presence or absence of the padding in the data structure and the length of the padding in the data structure.

According to any of the above-described aspects, the padding signal field may include a value selected from a set of values including: a first value for signalling absence of the padding and absence of the padding length information field; at least one second value for signalling presence of the padding having a certain respective length and absence of the padding length information field; and a third value for signalling presence of the padding having a length greater than a threshold and presence of the padding length information field.

According to any of the above-described aspects, the padding signal field may further include information about presence or absence of a synchronization information field in which information about synchronization of a stream including the data structure at a receiver of the data structure.

According to any of the above-described aspects, the padding signal field may include a two-bit value.

According to any of the above-described aspects, at least one information field among the information fields may include first information about a characteristic of the data or the data structure, and second information about the characteristic of the data or the data structure may be included in a signal field among the signal fields or an outside of the data structure. Here, the information field may be a SYNCD field and the characteristic may include a position of a data packet in the payload area.

According to any of the above-described aspects, the second information about the characteristic of the data or the data structure may be information common to two or more of the data structure.

According to any of the above-described aspects, the first information may include the least significant bits (LSBs) and the second information may include the most significant bits (MSBs).

According to any of the above-described aspects, at least one of the signal fields may include a value selected from a set of values including: a first value for signalling presence of the information fields; and a second value for signalling absence of the information fields.

According to any of the above-described aspects, the signal fields may include an offset signal field, and the information fields may include an offset information field for carrying offset information.

According to any of the above-described aspects, the offset information indicates an offset between the beginning of the payload area, excluding padding, and a first packet in the payload area.

According to any of the above-described aspects, the offset information field may carry first offset information, wherein the offset signal field comprises a region for carrying second offset information, wherein, when the offset signal field signals presence of the offset information field, offset information carried by the data structure is derived from the first offset information and the second offset information, and wherein, when the offset signal field signals absence of the offset information field, the offset information carried by the data structure is derived from the second offset information.

According to any of the above-described aspects, the data structure may include a fragmentation signal field for signalling whether packet fragmentation is used in the data structure.

According to any of the above-described aspects, the fragmentation signal field may be provided in L1 configurable signalling of the data.

According to any of the above-described aspects, the data may include one or more packets.

According to any of the above-described aspects, the data may include a packet fragment.

According to any of the above-described aspects, the packets may include an L2 packet.

According to any of the above-described aspects, at least one of the signal fields may be located in a header of a packet.

According to any of the above-described aspects, at least one of the information fields may be located in a header of a packet.

According to any of the above-described aspects, the signal fields each may have a fixed length.

According to any of the above-described aspects, the first sub-zone may have a fixed length.

According to any of the above-described aspects, at least one of the information fields may have a fixed length.

According to any of the above-described aspects, the data structure may include $K_{bch}$ bits, wherein $K_{bch}$ is the input length of a BCH encoder for encoding the data structure.

Other aspects, advantages, and salient features of the inventive concept will become apparent to those skilled in the art from the following detailed description, which, taken in conjunction with the annexed drawings, disclose exemplary embodiments of the invention.

BRIEF DESCRIPTION OF THE DRAWINGS

The above and other aspects, and features and advantages of certain exemplary embodiments and aspects of the inventive concept will be more apparent from the following detailed description when taken in conjunction with the accompanying drawings, in which.

DETAILED DESCRIPTION OF EXEMPLARY EMBODIMENTS

Figure 1:
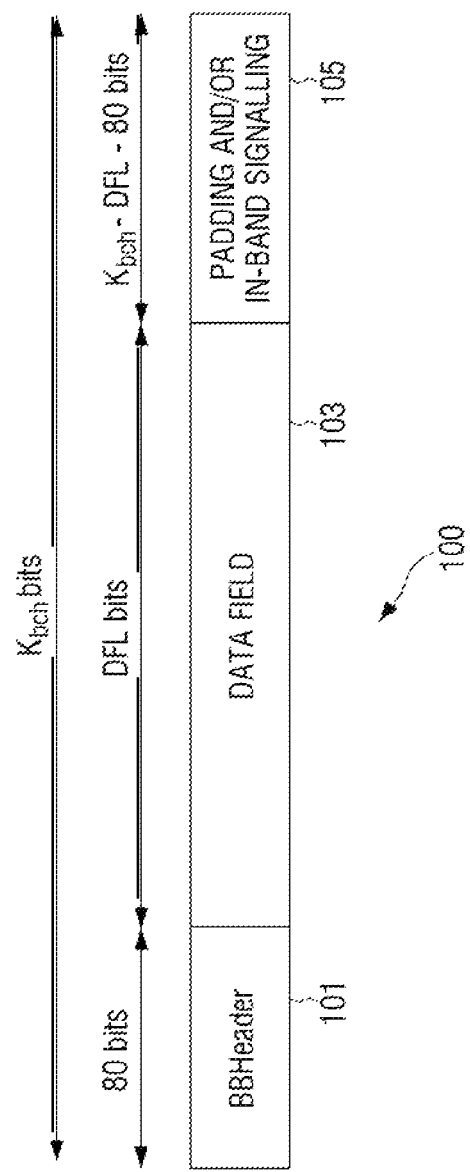
FIG. 1 illustrates the structure of a DVB-T2 BBFRAME.

The following description of exemplary embodiments of the inventive concept, with reference to the accompanying drawings, is provided to assist in a comprehensive understanding of the inventive concept, as defined by the claims. The description includes various specific details to assist in that understanding but these are to be regarded as merely exemplary. Accordingly, those of ordinary skill in the art will recognize that various changes and modifications of the exemplary embodiments described herein can be made without departing from the scope of the inventive concept.

The same or similar components may be designated by the same or similar reference numerals, although they may be illustrated in different drawings.

Detailed descriptions of techniques, structures, constructions, functions or processes known in the art may be omitted for clarity and conciseness, and to avoid obscuring the subject matter of the inventive concept.

The terms and words used herein are not limited to the bibliographical or standard meanings, but, are merely used by the inventor to enable a clear and consistent understanding of the inventive concept.

Throughout the description and claims of this specification, the words "comprise", "contain" and "include", and variations thereof, for example "comprising", "containing" and "including", means "including but not limited to", and is not intended to (and does not) exclude other features, elements, components, integers, steps, processes, functions, characteristics, and the like.

Throughout the description and claims of this specification, the singular form, for example "a", "an" and "the", encompasses the plural unless the context otherwise requires. For example, reference to "an object" includes reference to one or more of such objects.

Throughout the description and claims of this specification, language in the general form of "X for Y" (where Y is some action, process, function, activity or step and X is some hardware and/or software components for carrying out that action, process, function, activity or step) encompasses means X adapted, configured or arranged specifically, but not necessarily exclusively, to do Y.

Features, elements, components, integers, steps, processes, functions, characteristics, and the like, described in conjunction with a particular aspect, embodiment, example or claim of the inventive concept are to be understood to be applicable to any other aspect, embodiment, example or claim described herein unless incompatible therewith.

A data structure according to the inventive concept may be generated using any suitable method including operations for generating such a data structure. A data structure according to the inventive concept may be generated by any suitably arranged apparatus or system which includes components (or hardware and/or software) for generating such a data structure. Information may be extracted from a data structure according to the inventive concept using any suitable method including operations for extracting information from such a data structure. Information may be extracted from a data structure according to the inventive concept by any suitably arranged apparatus or system including components (or hardware and/or software) for extracting information from such a data structure. The methods described herein may be implemented in any suitably arranged apparatus or system including components (or hardware and/or software) for carrying out the method operations.

Exemplary embodiments of the inventive concept provide a data structure. For example, certain exemplary embodiments provide a baseband frame structure that may be used in future generation digital broadcasting systems, for example systems developed by the Digital Video Broadcasting (DVB) Project and/or the Advanced Television Systems Committee (ATSC) (e.g. the ATSC 3.0 Standard). However, the skilled person will appreciate that the inventive concept is not limited to use in connection with any particular system or standard, for example the ATSC 3.0 Standard, and that various exemplary embodiments provide a data structure that may be used in any suitable type of digital broadcasting system.

Exemplary embodiments of the inventive concept may be implemented in the form of any suitable method, system and/or apparatus for use in digital broadcasting, for example in the form of a mobile/portable terminal (e.g. mobile telephone), hand-held device, personal computer, digital television and/or digital radio broadcast transmitter and/or receiver apparatus, set-top-box, etc. Any such system and/or apparatus may be compatible with any suitable existing or future digital broadcast system and/or standard, for example one or more of the digital broadcasting systems and/or standards referred to herein.

In certain exemplary embodiments, DVB-T2 is used as a reference system in the design of the baseband frame structure. However, the skilled person will appreciate that the inventive concept is not limited to a DVB-T2 type frame structure, and that various exemplary embodiments may be based on any suitable type of frame structure.

In various exemplary embodiments of the inventive concept, each of one or more fields may be inserted dynamically into baseband frames according to whether each field is required in a particular baseband frame. In order to achieve this, one or more signal fields are inserted into each baseband frame, each signal field including information for signalling the presence or absence of one or more respective corresponding fields in the baseband frame. By dynamically inserting fields in this way (for example, inserting certain fields only when required), overhead efficiency may be improved. This scheme is in contrast to the baseband frame structure of DVB-T2 and DVB-NGH in which fields are typically systematically inserted into frames.

In various exemplary embodiments of the inventive concept, a baseband frame may include one or more areas. At least one of the areas may be divided into two or more sub-areas, and at least one of the sub-areas may be further divided into two or more further sub-areas to any desired level of sub-division. An area or sub-area may include a contiguous or non-contiguous region or portion of the frame, for example a contiguous or non-contiguous group of bits or bytes.

The signal fields may be located in one or more certain areas or sub-areas, and the fields corresponding to signal fields may be inserted (when needed) in one or more certain areas or sub-areas. The signal fields and the corresponding fields may be inserted into the baseband frame such that the signal fields and corresponding fields are arranged in a specific order. By locating the signal fields and corresponding fields in certain areas or sub-areas, and by arranging the signal fields and corresponding fields in a certain order, the signal fields and corresponding fields may be more easily located within the baseband frame, thereby reducing implementation complexity.

In addition, if one or more fields remain the same across multiple baseband frames (e.g. across all baseband frames of a given PLP in a given time period), then these fields may be relocated fully or partly away from the baseband frame (e.g. to L1 configurable signalling). For example, in certain exemplary embodiments, a baseband frame-level approach may be applied, whereby fields may be signalled on a per-baseband frame basis. In addition, a PLP-level approach may be applied, whereby all fields that are common across all baseband frames of a given PLP in a certain time interval are signalled in L1 signalling, instead of being embedded in the baseband frame itself. For example, an ISSY field includes three sub-fields. Two of these sub-fields are PLP-level and may be moved to L1 signalling, while the third sub-field may remain in the baseband frame. By omitting fields from the baseband frames that are not necessary, or by relocating fields as described previously, overhead efficiency may be improved.

For example, a baseband frame may include a first area (e.g. header area) for a header of the baseband frame, and a second area (e.g. payload area) for a data field of the baseband frame. Padding may be inserted in the payload area, or may be inserted in a third area (e.g. padding area) of the frame. In some exemplary embodiments, the header area may include at least two sub-areas, wherein one or more of the signal fields may be inserted in a first sub-area of the header area and the fields corresponding to the signal fields may be inserted (when needed) in a second area of the header area. In some exemplary embodiments, one or more of the signal fields and/or fields corresponding to the signal fields may be located elsewhere, for example in padding or in data packets carried in the data field.

The ordering of the areas, sub-areas, signal fields and/or fields corresponding to the signal fields may be modified according to design or other considerations.

The sizes of each area, sub-area, signal field and/or field corresponding to the signal fields may be fixed or variable. For example, each individual signal field, and each individual field corresponding to a signal field, may have a fixed size. An area or sub-area containing the signal fields may have a fixed length. An area or sub-area containing the fields corresponding to the signal fields may have a variable length depending on the fields present. A particular area or sub-area may have a fixed length, or may have a variable length that is indicated by a value contained in a signal field or a field corresponding to a signal field.

The skilled person will appreciate that the various configurations described above (including the ordering and sizes of areas, sub-areas, signal fields and fields corresponding to signal fields, and the insertion of signal fields and fields corresponding to signal fields in areas and sub-areas) are merely exemplary, and that any suitable configurations may be used in various exemplary embodiments of the inventive concept. Some examples of data structures (e.g. frame structures or codewords) are described below with reference to FIGS. 2-6.

Figure 2:
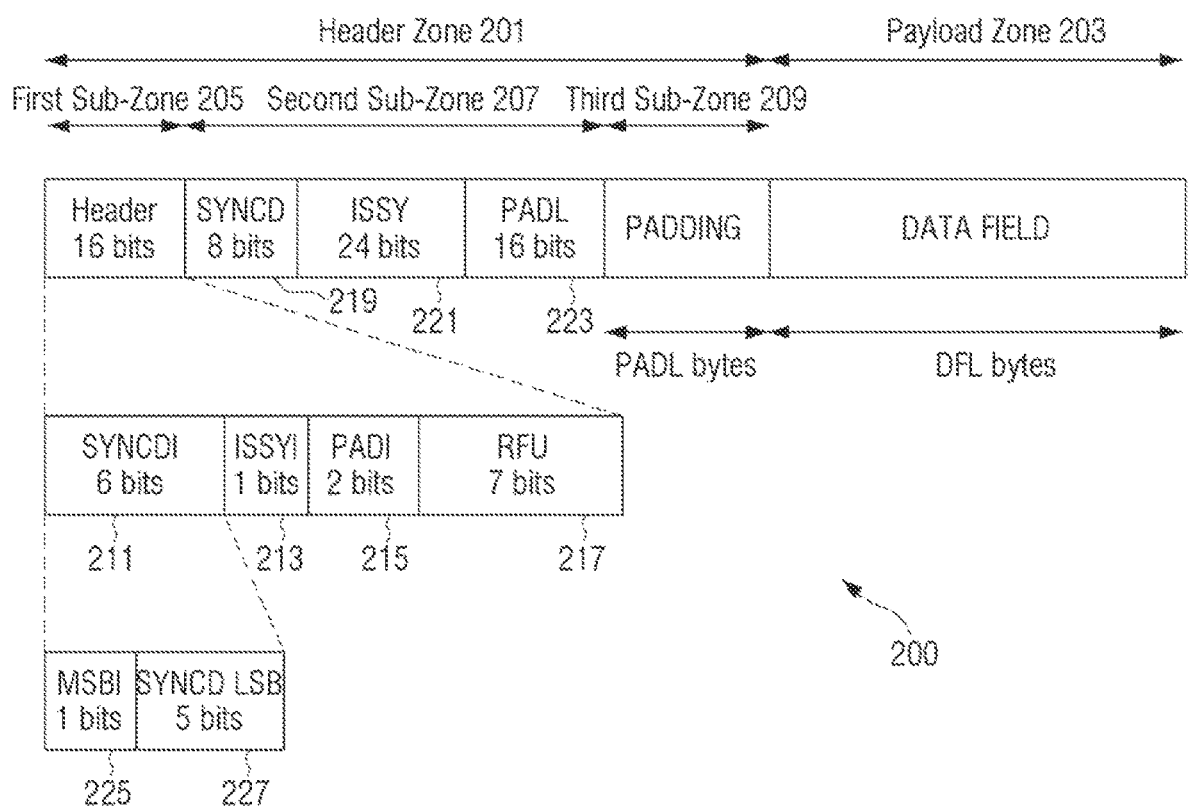
FIG. 2 illustrates a data structure according to an exemplary embodiment.

FIG. 2 illustrates a data structure, in the form of a baseband frame (referred to below simply as a 'frame'), according to an exemplary embodiment. A frame 200 includes a header area 201, and a payload area 203 corresponding to a data field. The header area 201 is divided into a first sub-area 205, a second sub-area 207, and a third sub-area 209.

The first sub-area 205 includes three signal fields, including a SYNCDI signal field 211, an ISSYI signal field 213, and a PADI signal field 215. The first sub-area 207 further includes an RFU field 217. In this exemplary embodiment, the first sub-area 205 has a fixed length of two bytes (this particular length being merely exemplary).

Each signal field contains a value which is encoded information to indicate whether a corresponding field is present in the frame 200. In particular, the SYNCDI signal field indicates whether a SYNCD field 219 is present in the frame, the SYNCD field 219 including information indicating an absolute or relative position of a first transmitted packet that starts in the data field/payload area. For example, the position may be indicated as a distance or offset (e.g. in bits) from the beginning of the data field to the beginning of the first transmitted packet which starts in the data field/payload area, or as a pointer to the first transmitted packet which starts in the data field/payload area. The ISSYI signal field 213 indicates whether an ISSY field 221 is present in the frame, the ISSY field 221 containing input stream synchronization information (for example, a value of a counter clocked at a modulator clock rate that can be used by a receiver to regenerate correct timing of a regenerated output stream). The PADI signal field 215 indicates whether a PADL field 223 is present in the frame, the PADL field 223 indicating the length of any padding in the frame 200.

In this exemplary embodiment, the SYNCD field 219 has a fixed length of one byte, the ISSY field 221 has a fixed length of three bytes, and the PADL field 223 has a fixed length of two bytes (these particular lengths being merely exemplary).

The second sub-area 207 includes the fields corresponding to the signal fields, specifically the SYNCD field 219, the ISSY field 221, and the PADL field 223, when these fields are present, as indicated by the corresponding signal fields 211, 213, and 215. The length of the second sub-area 207 is variable depending on which fields (if any) are present. For example, if all of the SYNCD 219, ISSY 221, and PADL 223 fields are present, then the second sub-area 207 has a length of six bytes.

The third sub-area 209 includes padding and/or signalling data. The length of the third sub-area 209 including the padding is variable depending on whether the padding is present, and the length of the padding. In particular, the length of the third sub-area 209 is indicated in the PADL field 223.

Figure 3:
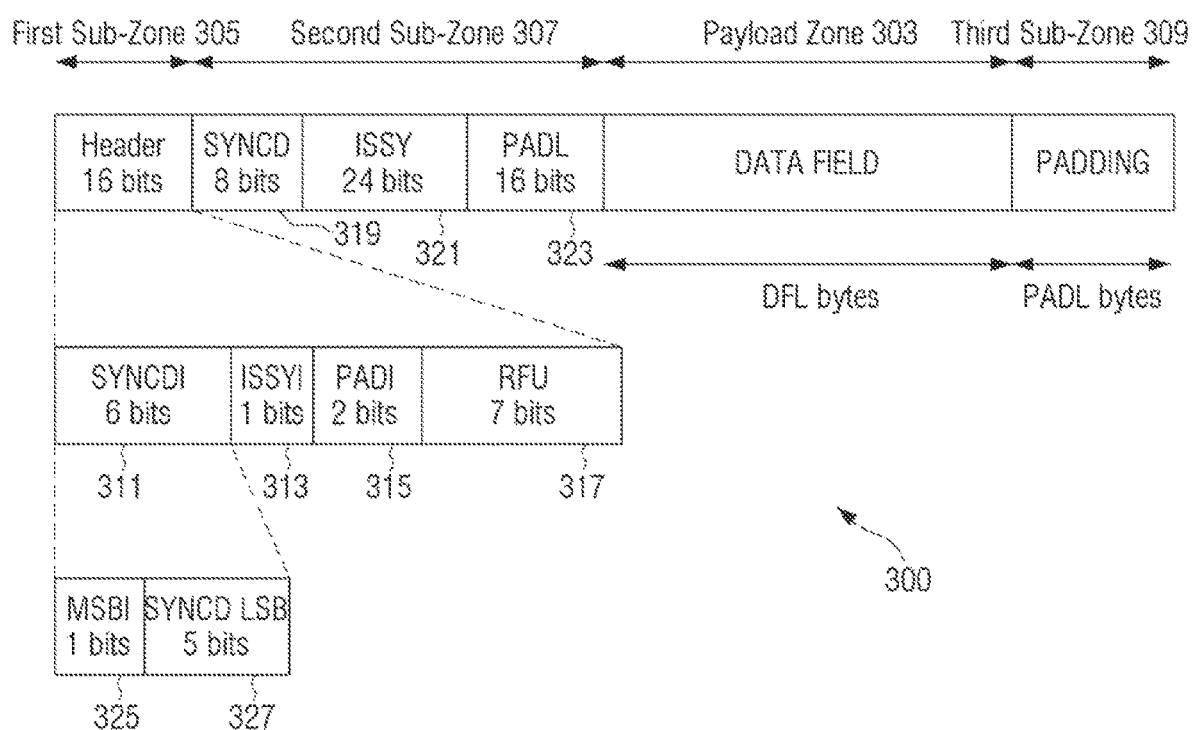
FIG. 3 illustrates a data structure according to another exemplary embodiment.

In the example illustrated in FIG. 2, the third sub-area 209 is located before the payload area 203. However, in alternative exemplary embodiments, the third sub-area 209 may be located elsewhere, for example after the payload area 203. For example, FIG. 3 illustrates a data structure, in the form of a baseband frame, according to another exemplary embodiment. According to FIG. 3, a frame 300 includes a third sub-area 309 containing padding which is located after a payload area 303.

In some exemplary embodiments, a signal field may include a one-bit flag whose value indicates presence or absence of a corresponding field in a frame. For example, in the exemplary embodiment illustrated in FIG. 2, the ISSYI signal field 213 includes a one-bit flag, which is set to a first value (e.g. 1) if the ISSY field 221 is present in the frame 200, and is set to a second value (e.g. 0) if the ISSY field 221 is not present in the frame 200. By adding fields, for example the ISSY field 221, dynamically only when needed, for example on a frame-by-frame basis, overhead efficiency may be improved. The skilled person will appreciate that the aforementioned technique applied in relation to the ISSY signal field 213 and ISSY field 221 may also be applied in relation to other signal fields and corresponding fields.

In some exemplary embodiments, a signal field may include not only information indicating presence or absence of a corresponding field in a frame, but also additional information. For example, in the exemplary embodiment illustrated in FIG. 2, the SYNCDI signal field 211 includes a one-bit flag 225, which is set to a first value (e.g. 1) if the SYNCD field 219 is present in the frame 200, and is set to a second value (e.g. 0) if the SYNCD field 219 is not present in the frame 200.

The SYNCDI signal field 211 may further include one or more additional bits 227 for carrying additional information in the form of an additional SYNCD value, according to an exemplary embodiment. In this embodiment, when the SYNCDI signal field 211 indicates (by the one-bit flag 225) presence of the SYNCD field 219 in the frame 200, then SYNCD information is derived by combining (e.g. by concatenation) the value of the SYNCD field 219 and the additional SYNCD value carried by the additional bits 227 of the SYNCDI signal field. For example, the additional bits 227 of the SYNCDI signal field 211 may carry the least significant bits (LSBs) of the SYNCD information and the SYNCD field 219 may carry the most significant bits (MSBs) of the SYNCD information. On the other hand, when the SYNCDI signal field 211 indicates (by the one-bit flag 225) absence of the SYNCD field 219, then the SYNCD information is derived from the additional SYNCD value carried by the additional bits 227 of the SYNCDI signal field 211 alone.

In this way, the SYNCD information may be carried by a variable number of bits depending on presence or absence of the SYNCD field 219, as indicated by the SYNCDI signal field 211. For example, in the exemplary embodiment illustrated in FIG. 2, the SYNCDI signal field 211 includes six bits in total, including a one-bit indicator flag 225 and five additional bits 227, and the SYNCD field 219 includes eight bits. Thus, the SYNCD information may be carried by either five bits (the additional bits 227 of the SYNCDI signal field 211 alone) or 13 (=5+8) bits (the additional bits 227 combined with the SYNCD field 219). In this way, the SYNCD information may be carried by a variable number of bits depending on how many bits are actually needed to carry the value, thereby increasing overhead efficiency. The skilled person will appreciate that the aforementioned technique applied in relation to the SYNCDI signal field 211 and SYNCD field 219 may also be applied in relation to other signal fields and corresponding fields.

In some exemplary embodiments, the PADI signal field 215 may include a one-bit flag, which is set to a first value (e.g. 1) if the PADL field 223 is present in the frame 200, and is set to a second value (e.g. 0) if the PADL field 223 is not present in the frame 200. In the case that fragmentation is used, the padding in the third sub-area 209 may not be needed because packets may be fragmented down to a relatively small size (e.g. 1 byte), to allow packets to fill the full capacity of the data field 203. Therefore, omitting the PADL field 223 when fragmentation is used may improve overhead efficiency.

In the exemplary embodiment illustrated in FIG. 2, the PADI signal field 215 is used not only to indicate presence or absence of the PADL field 223 in the frame 200, but also to carry information relating to the length of the padding in the frame 200. For example, the PADI signal field 215 may carry information indicating the length of the padding, or alternatively whether the length of the padding exceeds a certain threshold. In the case that the length of the padding exceeds the certain threshold, the length of the padding may be indicated by the PADL field 223.

For example, in the exemplary embodiment illustrated in FIG. 2, the PADI signal field 215 includes two bits, which may carry one of four two-bit values 00, 01, 10, and 11. A first value (e.g. 00) indicates that the frame 200 contains no padding, and that the PADL field 223 is not present in the frame 200 (since the PADL field 223 is not needed because the frame carries no padding). A second value (01) indicates that the frame 200 contains the padding, that the padding has a length of one unit (e.g. 1 byte), and that the PADL field 223 is not present in the frame 200 (since the PADL field 223 is not needed because the padding length is indicated by the PADI signal field 215). A third value (e.g. 10) indicates that the frame 200 contains the padding, that the PADL field 223 is present in the frame 200, and that the padding has a length of more than one unit (e.g. more than 1 byte), in which case the PADL field 223 indicates the length of the padding. A fourth value (e.g. 11) may be reserved for future use. By incorporating padding length information in the PADI signal field 215, the PADL field 223 may be omitted in some situation, thereby improving overhead efficiency.

Figure 4:
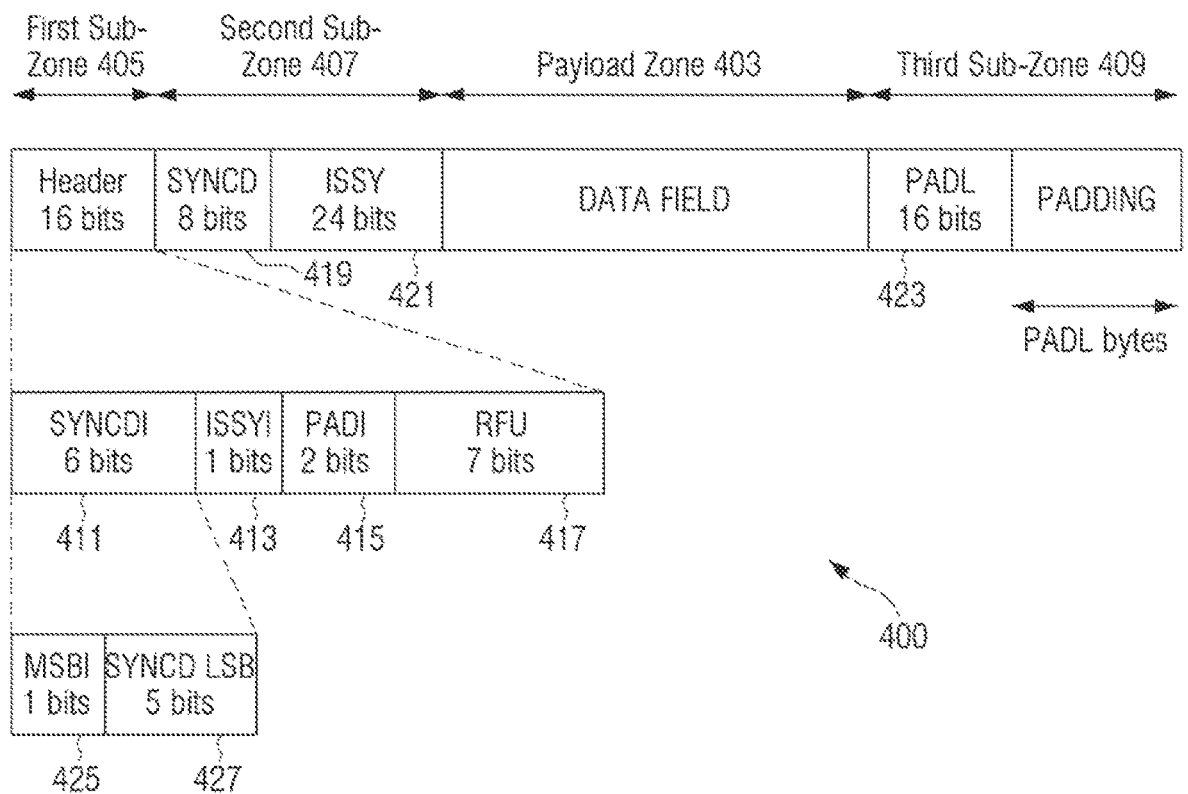
FIG. 4 illustrates a data structure according to still another exemplary embodiment.

In the exemplary embodiment illustrated in FIG. 2, the PADL field 223 is located in the second sub-area 207. However, in alternative exemplary embodiments, the PADL field 223 may be inserted in a different location. For example, the PADL field 223 may be inserted within an area at the end of the frame 200. In some exemplary embodiments, the PADL field 223 may be inserted within a certain portion of the padding (e.g. the first x bytes or last x bytes of the padding). In this case, the value of the PADL field 223 may indicate the length of the remaining padding (i.e. the padding excluding the PADL field 223). For example, FIG. 4 illustrates a data structure, in the form of a baseband frame, according to still another exemplary embodiment. According to FIG. 4, a frame 400 includes a third sub-area 409 containing padding which is located after a payload area 403, and a PADL field 423 is located at the end of the frame 400 as part of the padding.

As described above, in various exemplary embodiments, the PADL field 223 may be inserted into a number of different locations or areas in the frame 200. A similar principle may be applied to one or more of the other fields. For example, while the signal fields are preferably, but not necessarily, each located within the header area 201 of the frame, and/or within some other header region within the frame 200 (e.g. within a header of a packet in the frame), the corresponding fields may be inserted into a variety of locations or areas within the frame (e.g. a dedicated area in the header area 201, the padding area 209, the payload area 203, or another area), for example according to a design choice. Different fields need not necessarily be inserted into the same region, portion or area of the frame 200.

In other exemplary embodiments, the PADI signal field 215 may include more than two bits. For example, the PADI signal field 215 may include n bits that may take $2^n$ different values. A first subset of these values may signal absence of the padding and the PADL field 223 in the frame 200. A second subset of the values may signal absence of the PADL field 223, but presence of the padding within the frame 200, where each value of the second subset may signal presence of the padding having a certain respective length. A third subset of the values may signal presence of the padding having a length greater than a threshold and the presence of the PADL field 223 for indicating the length of the padding.

Figure 5:
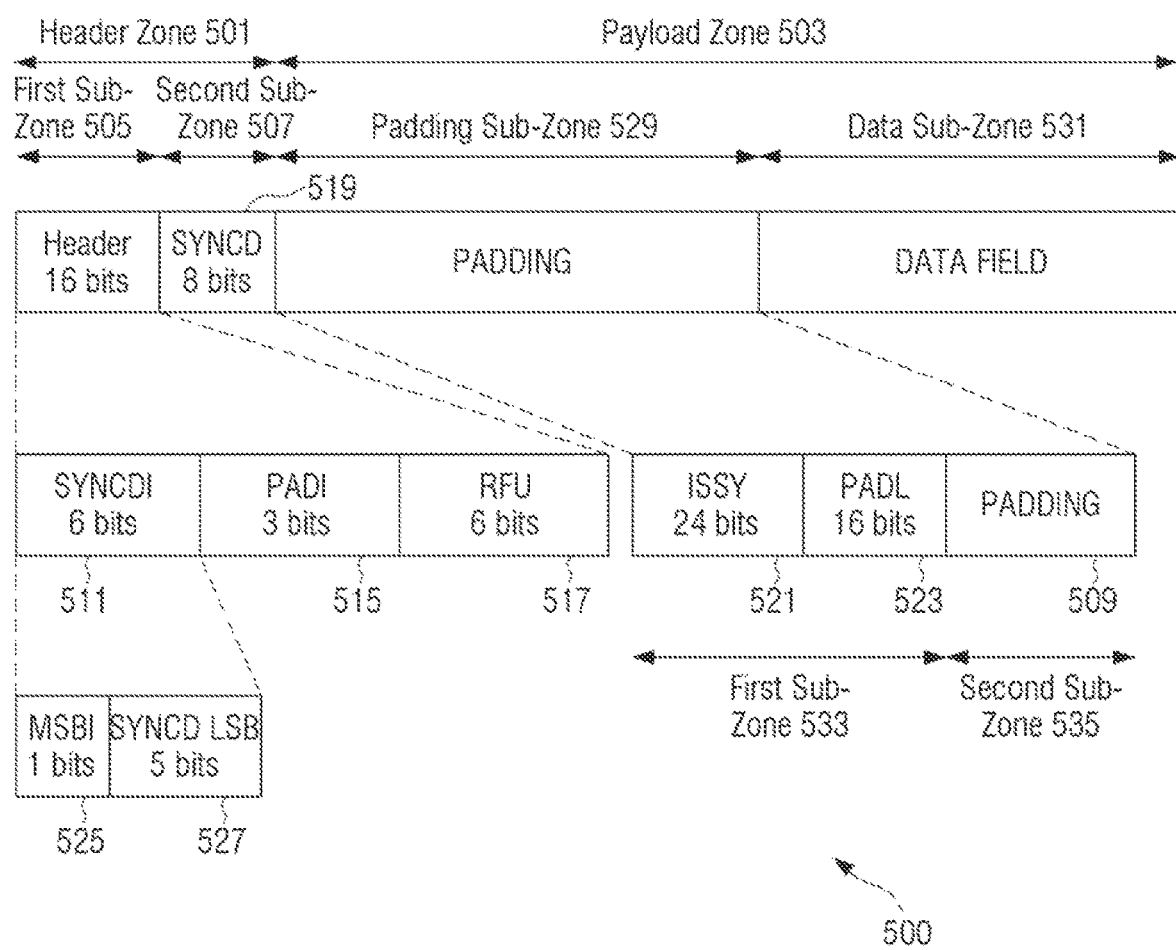
FIG. 5 illustrates a data structure according to still another exemplary embodiment.

For example, FIG. 5 illustrates a data structure, in the form of a baseband frame, according to still another exemplary embodiment. According to FIG. 5, a frame 500 includes a PADI signal field 515 of three bits. In this embodiment, a SYNCD field 519 is inserted in a second sub-area 507 of a header area 501. In addition, a payload area 503 is divided into a padding sub-area 529 and a data sub-area 531, wherein padding 509 is inserted within the padding sub-area 529 and the data field is provided in a data sub-area 531. Furthermore, the padding sub-area 529 is further sub-divided into a first sub-area 533 of fixed length and a second sub-area 535 of variable length, wherein an ISSY field 521 and a PADL field 523 are inserted into a first sub-area 533 of the padding sub-area 529 and padding 509 is inserted into a second sub-area 535 of the padding sub-area 529. For example, the ISSY field 521 may occupy the first three bytes of the first sub-area 533 of the padding sub-area 529 and the PADL field 523 may occupy the next two bytes of the first sub-area 533 of the padding sub-area 529.

In the exemplary embodiment illustrated in FIG. 5, a first value (e.g. 000) of the PADI signal field 515 indicates absence of the padding 509 and absence of the PADL field 523. A second value (e.g. 001) indicates presence of one unit (e.g. 1 byte) of the padding 509 and absence of both the PADL field 523 and the ISSY field 521. A third value (e.g. 010) indicates presence of two units (e.g. 2 bytes) of the padding 509 and absence of both the PADL field 523 and the ISSY field 521. A fourth value (e.g. 011) indicates presence of more than two units (e.g. more than 2 bytes) of the padding 509, presence of the PADL field 523, and absence of the ISSY field 521. A fifth value (e.g. 100) indicates presence of more than two units (e.g. more than 2 bytes) of the padding 509, and presence of both the PADL field 523 and the ISSY field 521. Other values (e.g. 101-111) may be reserved for future use.

In the exemplary embodiment illustrated in FIG. 5, the padding sub-area 529 is located before the data sub-area 531 in the payload area 503. In an alternative exemplary embodiment, the padding sub-area 529 may be located after the data sub-area 531 in the payload area 503.

The exemplary embodiment illustrated in FIG. 5 is one example in which a single signal field is used to signal presence or absence of not only a corresponding field but also another field that may correspond to another signal field. For example, in the exemplary embodiment illustrated in FIG. 5, a three-bit PADI signal field 515 is treated as a single value and used to indicate one of the various configurations involving both the PADL field 523 and the ISSY field 521, as described above. However, in other exemplary embodiments, separate signal fields may be provided for the PADL field 523 and the ISSY field 521. For example, the three-bit PADI signal field 515 described above may be replaced with a two-bit PADI signal field and a one-bit ISSYI signal field.

For example, a first value (e.g. 00) inserted in the PADI signal field 515 may indicate absence of the padding 509 and absence of the PADL field 523. A second value (e.g. 01) inserted in the PADI signal field 515 may indicate presence of one unit (e.g. 1 byte) of the padding 509 and absence of the PADL field 523. A third value (e.g. 10) inserted in the PADI signal field 515 may indicate presence of two units (e.g. 2 byte) of the padding 509 and absence of the PADL field 523. A fourth value (e.g. 11) inserted in the PADI signal field 515 may indicate that the frame 500 contains the padding 509 having a length of more than two units (e.g. more than 2 bytes), and that the PADL field 523 is present in the frame, for example in the first sub-area 533 of the padding sub-area 529.

For example, a first value (e.g. 0) inserted in the ISSYI signal field may indicate that the ISSY field 521 is not present in the frame 500. A second value (e.g. 1) inserted in the ISSYI signal field may indicate that the ISSY field 521 is present in the frame 500, for example in the first sub-area 533 of the padding sub-area 529.

The skilled person will appreciate that the aforementioned technique applied in relation to the PADI signal field 515 and PADL field 523 may also be applied in relation to other signal fields and corresponding fields.

The skilled person will also appreciate that the techniques described above in relation to different signal fields and corresponding fields may be combined together. For example, a signal field may be provided that carries information that may be combined with information carried in a corresponding field (if present) in the frame, for example in a similar manner to the SYNCDI signal field 211 and the SYNCD field 219 described above. The same signal field may also carry information relating to the length, or some other property or characteristic, of a field in the frame (if present), for example in a similar manner to the PADI signal field 215 and the PADL field 223 described above.

The RFU field 217 includes a number of bits reserved for future use. For example, the bits of the RFU field 217 may be used to add one or more additional signal fields and/or one or more other types of fields or flags, to add functionality. The RFU field 217 may have a length such that the overall length of the first sub-area 205 has a certain fixed length. For example, in the specific example illustrated in FIG. 2 that the SYNCDI 211, ISSYI 213 and PADI 215 signal fields are six bits, one bit, and two bits, respectively, and the overall length of the first sub-area 205 is two bytes, then the RFU field 217 has a length of seven bits. In other examples in which the SYNCDI 211, ISSYI 213 and PADI 215 signal fields include other specific numbers of bits, or the overall length of the first sub-area 205 is different, then the length of the RFU field 217 may be modified accordingly. By providing the RFU field 217, the frame structure 200 has the capacity to be extended with relatively minor modifications, to enable the frame structure 200 to incorporate new features and co-exist with both legacy and future standards.

Figure 6:
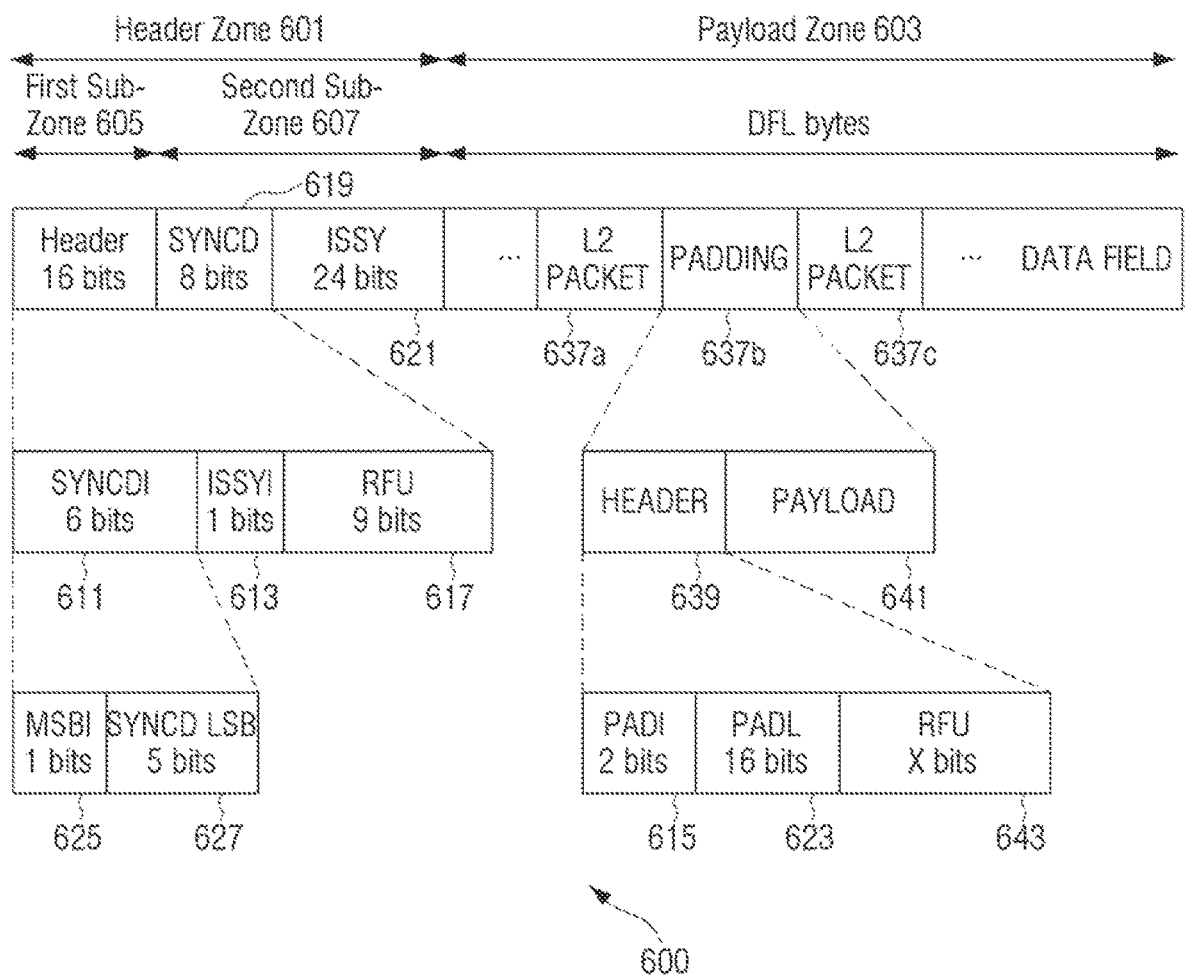
FIG. 6 illustrates a data structure according to still another exemplary embodiment.

FIG. 6 illustrates a data structure, in the form of a baseband frame, according to still another exemplary embodiment. In this embodiment, a frame 600 includes a header area 601 and a payload area 603. The header area 601 is divided into a first sub-area 605 and a second sub-area 607. The first sub-area 605 of the header area 601 carries a SYNCDI signal field 611, an ISSYI signal field 613 and an RFU field 615, for example the same as, or similar to, the signal fields described above. The second sub-area 607 of the header area 601 carries a SYNCD field 619 and an ISSY field 621 (if present), for example the same as, or similar to, the fields described above. The payload area 603 corresponds to a data field that carries one or more data packets 637a to 637c, for example UPs received from L2.

In the exemplary embodiment illustrated in FIG. 6, one or more of the packets 637a to 637c carried in the payload area 603 may be used to carry one or more signal fields and/or one or more corresponding fields. The packets 637a to 637c may include one or more padding packets 637b, which are packets dedicated for carrying padding and/or signalling. As illustrated in FIG. 6, a padding packet 637b carried in the payload area 603 includes a header portion 639 and a payload portion 641. The header portion 639 is used to carry a PADI signal field 615, a corresponding PADL field 623, and an RFU field 643, for example the same as, or similar to, the signal fields and fields described above. The payload portion 641 of the padding packet 637b may be used to carry padding and/or signalling. In the exemplary embodiment illustrated in FIG. 6, the header portion 639 of the padding packet 637b may be regarded as an area in which the PADI signal field 615, the corresponding PADL field 623, and the RFU field 643 are carried.

In some exemplary embodiments, each signal field may be used to indicate presence or absence of a corresponding respective field in the frame. In other exemplary embodiments, a single signal field may be used to signal presence or absence of more than one field in the frame. For example, a single signal field may include a one bit value or a multi-bit value, wherein different values indicate presence of certain respective combinations of fields in the frame. For example, a one bit flag may be set to a first value (e.g. 1) to indicate presence of both of two fields in the frame, and may be set to a second value (e.g. 0) to indicate absence of the two fields. An n-bit value may be set to one of $2^n$ values to indicate or signal that a certain corresponding subset of m fields (or all fields) is present (or alternatively, absent) in the frame.

The skilled person will appreciate that the specific combinations of signal fields illustrated in FIGS. 2-6 are merely exemplary. For example, in some exemplary embodiments, the frame may include only some, one, or none of the signal fields illustrated in FIGS. 2-6. In some exemplary embodiments, the frame may include one or more additional signal fields not illustrated in FIGS. 2-6. In some exemplary embodiments, one or more of the signal fields illustrated in FIGS. 2-6 may be replaced with alternative signal fields.

As mentioned above, the frame 200 may use fragmentation or no fragmentation. The various techniques described above may be used in cases of both fragmentation and no fragmentation. However, in the case of no fragmentation, the start of the data field 203 is typically always aligned with the start of a UP, since no UP is broken and UPs are inserted into the data field 203 starting from the beginning of the data field 203. Therefore, in the case of no fragmentation, the SYNCD information is not required, and thus, the SYNCDI signal field 211 and the corresponding SYNCD field 219 may be omitted in the case of no fragmentation.

In order to indicate whether fragmentation is applied, a fragmentation indicator value FRAGI (e.g. a one-bit flag) may be inserted in the frame 200. Alternatively, since fragmentation is typically performed at the PLP-level (i.e. the same fragmentation mode is typically applied to all frames 200 of a given PLP in a certain time interval), then the FRAGI may be moved to L1 signalling. For example, when FRAGI takes a first value (e.g. 1), this indicates that fragmentation is applied. On the other hand, when FRAGI takes a second value (e.g. 0), this indicates that fragmentation is not applied. The SYNCDI signal field 211 and the SYNCD field 219 may be used according to the value of FRAGI.

As described above, the structure of a frame may be signalled, indicated or specified using signal fields in a header area, region or portion of the frame. In certain exemplary embodiments, the frame structure may be signalled, indicated or specified using other suitable signalling resources, for example L1 signalling. Other signalling resources, for example L1 signalling, may also be used to carry information that may be combined with information carried in the fields of the frame described above. For example, in some exemplary embodiments, ISSY information may be carried partly by the ISSY field and partly by L1 signalling. Presence or absence of information carried by other signalling resources may be signalled, indicated or specified using signal fields in the frame.

Figure 7:
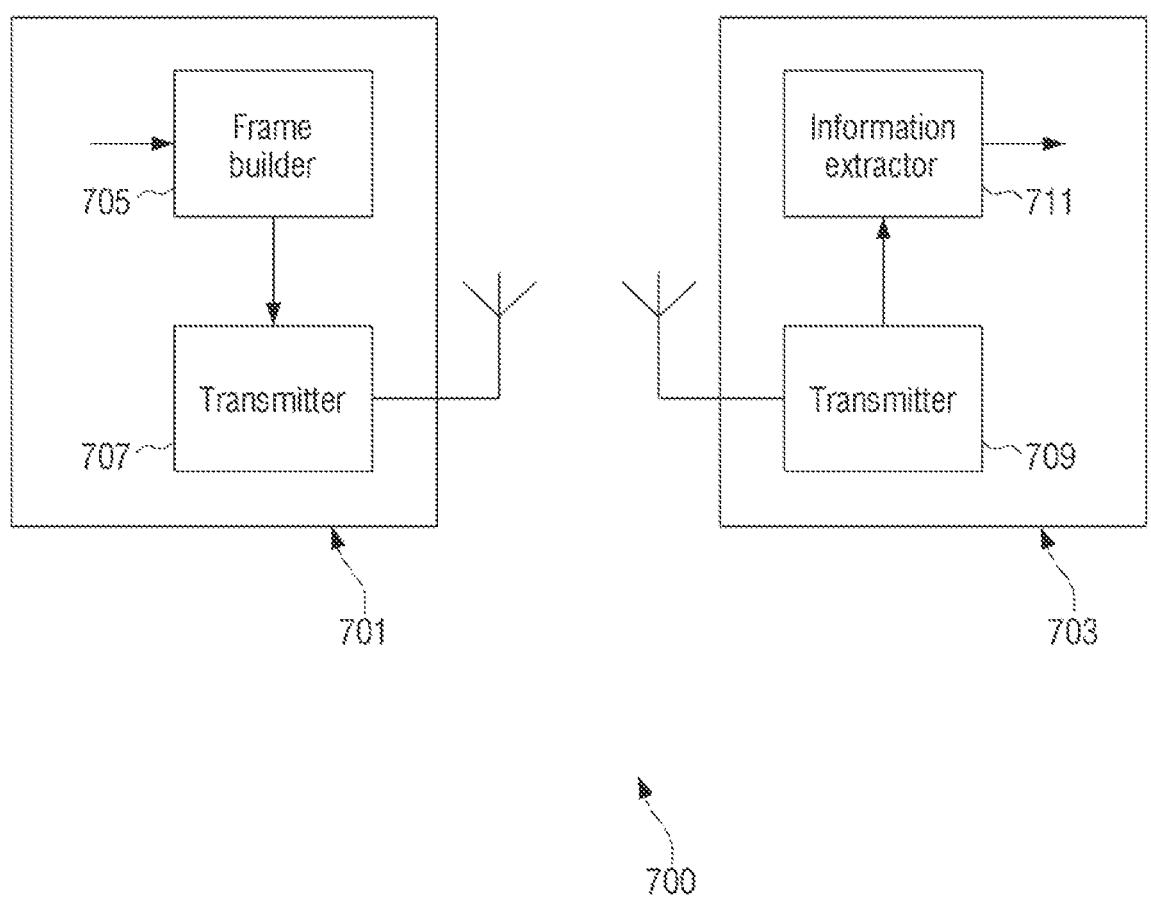
FIG. 7 illustrates a system embodying the inventive concept.
Figure 8A:
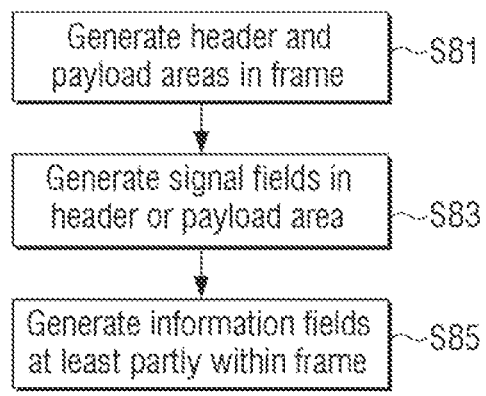
FIGS. 8A-8B illustrate exemplary methods according to an inventive concept.
Figure 8B:
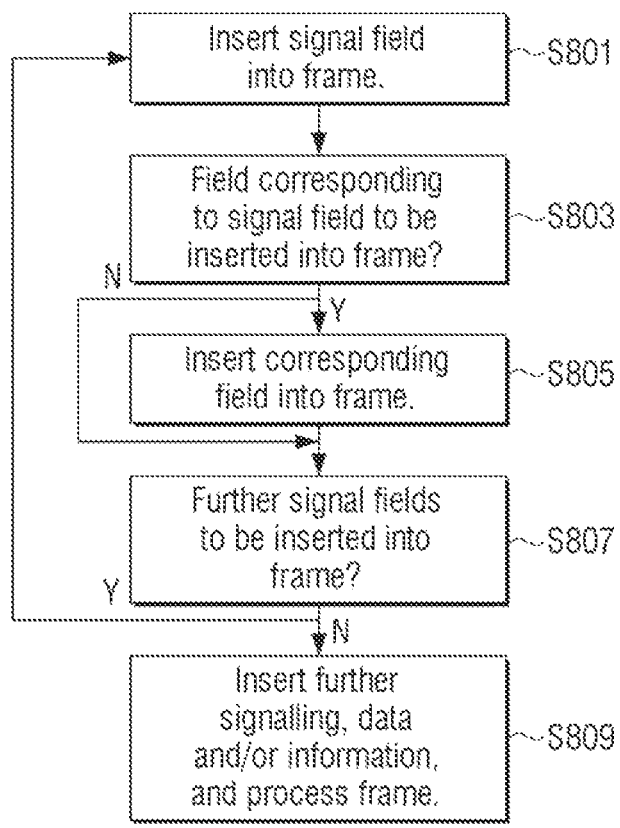
Figure 9:
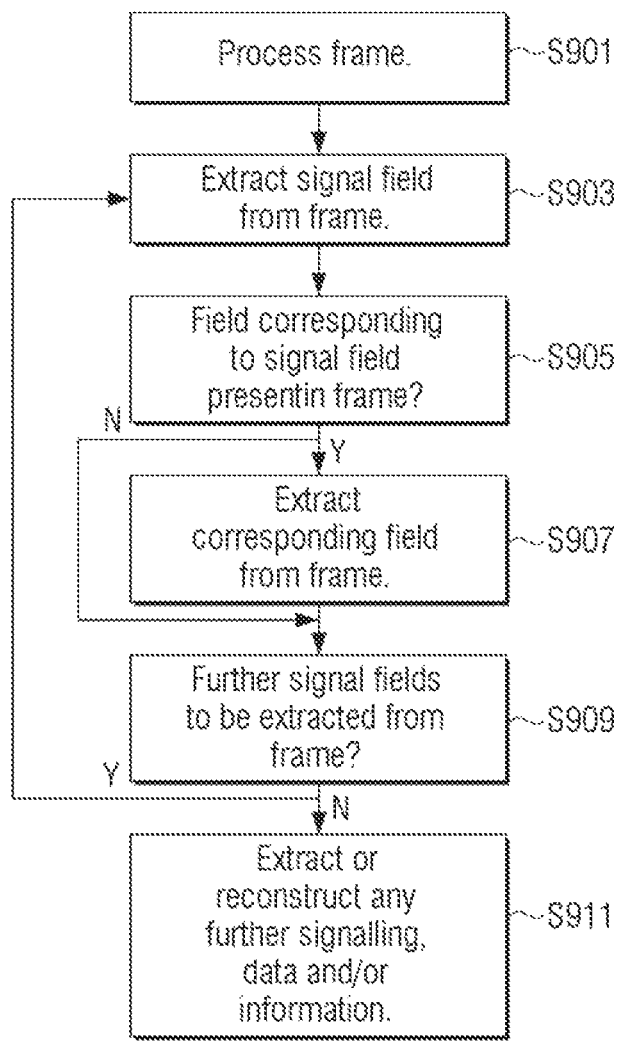
FIG. 9 illustrates another exemplary method according to an inventive concept.

FIG. 7 illustrates a system 700 embodying the inventive concept, and FIGS. 8A-8B and 9 illustrate exemplary methods in reference to FIGS. 2-6, according to the inventive concept.

The system 700 may be in the form of an ATSC 3.0 system including an ATSC 3.0 transmitter apparatus 701 (e.g. a mobile terminal) and/or an ATSC 3.0 receiver apparatus 703 (e.g. a mobile terminal). The skilled person will appreciate that FIG. 7 schematically illustrates only those components relating specifically to the frame structures illustrated in FIGS. 2-6 and described above, and that the apparatus 701, 703 illustrated in FIG. 7 may include one or more additional components in various exemplary embodiments.

The transmitter apparatus 701 includes a frame builder 705 and a transmitter 707. The frame builder 705 is configured for building a frame using information (e.g. data, signalling, etc.) received by the frame builder 705, for example from other components (not shown) within the apparatus 701. For example, the frame builder 705 is configured for building a frame having a structure according to one or more exemplary embodiments of the inventive concept, including one or more of the frame structures described above.

According to an exemplary embodiment, as illustrated in FIG. 8A, the frame builder 705 generates a header area and a payload area in a frame such as the header area 201 and the payload area 203 in the frame 200 as shown in FIG. 2 (S81). Further, the frame builder 705 generates, in the header area or the payload area, one or more signal fields for signalling presence or absence of one or more corresponding information fields to be located at least partly within the frame (S83). Also, the frame builder 705 generates the one or more corresponding information fields at least partly within the frame, according to the signalling (S85).

Specifically, as illustrated in FIG. 8B, the frame builder 705 inserts a first signal field (e.g. an ISSYI signal field 213) into the frame at a designated location (e.g. in the first sub-area 205 of the header area 201) (S801). For example, the first signal field may have a form and content according to a signal field used in relation to any of the exemplary embodiments described herein, or any other exemplary embodiments according to the inventive concept. Once the first signal field is inserted into the frame, the frame builder 705 determines whether a first field corresponding to the first signal field should be inserted in the frame based on the value of the first signal field (S803). If the frame builder 705 determines that the first field should be inserted in the frame, the frame builder 705 inserts the first field (e.g. an ISSY field 221) in the frame 200 at a designated location (e.g. in a second sub-area 207 of the header area 201) (S805). For example, the first field may have a form and content according to a field used in relation to any of the exemplary embodiments described herein, or any other exemplary embodiments according to the inventive concept. After inserting the first field in the frame, or after determining that the first field should not be inserted in the frame, the frame builder 705 repeats preceding operations 801-805 for any subsequent signal fields (e.g. a SYNCDI signal field 211 and a PADI signal field 215) and corresponding fields (e.g. a SYNCD field 219 and a PADL field 223) to be inserted into the frame (S807).

After inserting all required signal fields and corresponding fields, the frame builder 705 completes the frame by inserting any further required signalling, data and/or information in the frame (S809), for example by inserting one or more UPs into the data field 203 and/or by adding any required padding.

In the above embodiment, the frame builder 700 generates or inserts one or more information fields at least partly in the frame according to signalling indicated in one or more signal fields or according to a result of determining whether the one or more fields should be generated or inserted at least partly in the frame. However, the inventive concept is not limited hereto. That is, according to another exemplary embodiment, the frame builder 700 may first generate or insert one or more information fields at least partly in the frame, and then, generate or insert signal fields corresponding to the one or more information fields.

After the frame builder 705 has built the frame, the frame may be processed if required, for example to perform outer and inner coding of the frame. The processing may be performed by the frame builder 705, and/or by one or more other components (e.g., BCH encoder). The transmitter 707 then transmits the processed frame to the receiver apparatus 703. The receiver apparatus 703 includes a receiver 709 for receiving the transmitted frame and an information extractor 711. The information extractor 711 is configured for analyzing the received frame and for extracting information carried by the various fields of the frame. The information extractor 711 is configured for extracting information from a frame having a structure according to one or more exemplary embodiments of the inventive concept, including one or more of the frame structures described above.

For example, as illustrated in FIG. 9, the information extractor 711 obtains the frame, after any required processing has been performed (S901). Next, the information extractor 711 extracts a first signal field (e.g. the ISSYI signal field 213) from the frame at a designated location (e.g. in the first sub-area 205 of the header area 201) (S903). Next, the information extractor 711 determines whether a first field corresponding to the first signal field is present in the frame based on the value of the first signal field (S905). If the information extractor 711 determines that the first field is present in the frame, the information extractor 711 extracts the first field (e.g. an ISSY field 221) from the frame at a designated location (e.g. in the second sub-area 207 of the header area 201) (S907). After extracting the first field from the frame, or after determining that the first field is not present in the frame, the information extractor 711 repeats preceding operations 903-907 for any subsequent signal field (e.g. a SYNCDI signal field 211 and a PADI signal field 215) and corresponding fields (e.g. a SYNCD field 219 and a PADL field 223) to be extracted from the frame.

The information extractor 711 may also extract or reconstruct any further required signalling, data and/or information (S911). For example, the information extractor 711 may extract any padding and/or signalling from the received frame 200 according to the padding length indicated by the PADI signal field 215 and/or the PADL field 223. The information extractor 711 may reconstruct SYNCD information based on the values indicated in the SYNCDI signal field 211 and the SYNCD field 219. The information extractor 711 may extract data, for example UPs, from the data field 203.

It will be appreciated that the exemplary embodiments of the inventive concept can be realized in the form of hardware, software or a combination of hardware and software. Any such software may be stored in the form of volatile or non-volatile storage, for example a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like.

It will be appreciated that the storage devices and storage media are exemplary embodiments of machine-readable storage that are suitable for storing a program or programs including instructions that, when executed, implement certain exemplary embodiments of the inventive concept. Accordingly, certain exemplary embodiments provide a program including code for implementing a method, apparatus or system as claimed in any one of the claims of this specification, and a machine-readable storage storing such a program. Still further, such programs may be conveyed electronically via any medium, for example a communication signal carried over a wired or wireless connection, and exemplary embodiments suitably encompass the same.

While the inventive concept has been shown and described with reference to certain exemplary embodiments thereof, it will be understood by those skilled in the art that various changes in form and detail may be made therein without departing from the scope of the inventive concept, as defined by the appended claims.

What is claimed is:

1. A receiving apparatus comprising:
   a receiver configured to receive a television broadcast signal based on a frame, the frame comprising a header and a payload based on input packets; and
   a processor configured to,
   process the television broadcast signal,
   identify the header and the payload from the processed television broadcast signal,
   identify a first field and a second field from the header,
   identify an input packet included in the payload based on the first field and the second field, and
   transmit the input packet to an upper layer,
   wherein the first field comprises a first value or a second value,
   wherein based on the first field comprising the first value, the second field comprises a least significant bit (LSB) pointer field without including a most significant bit (MSB) pointer field, and
   wherein based on the first field comprising the second value, the second field comprises the LSB pointer field and the MSB pointer field, and
   wherein the second field comprises a pointer value, the pointer value being an offset from a beginning of the payload to a first start position of the input packet that begins in the payload.

2. The apparatus of claim 1, wherein the header is divided into a first sub-area and a second sub-area, and
   wherein the first field is included in the first sub-area and the second field is included in the second sub-area.

3. The apparatus of claim 1, wherein the header further comprises information indicating presence of a third field in the header, and
   wherein the third field comprises length information indicating a length of padding.

4. The apparatus of claim 1, wherein the header further comprises information indicating a length of padding.

5. The apparatus of claim 1, wherein the header further comprises information indicating whether a length of padding is greater than a predetermined value.

* * * * *